(12) United States Patent
Da Silva et al.

(10) Patent No.: US 11,190,261 B2
(45) Date of Patent: Nov. 30, 2021

(54) CONNECTION RE-CONFIGURATION UPON BEAM RECOVERY RESPONSE

(71) Applicant: TELEFONAKTIEBOLAGET LM ERICSSON (PUBL), Stockholm (SE)

(72) Inventors: Icaro L. J. Da Silva, Solna (SE); Helka-Liina Määttanen, Helsinki (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/638,460

(22) PCT Filed: Aug. 10, 2018

(86) PCT No.: PCT/IB2018/056050
§ 371 (c)(1),
(2) Date: Feb. 11, 2020

(87) PCT Pub. No.: WO2019/030725
PCT Pub. Date: Feb. 14, 2019

(65) Prior Publication Data
US 2020/0373990 A1    Nov. 26, 2020

Related U.S. Application Data

(60) Provisional application No. 62/544,641, filed on Aug. 11, 2017.

(51) Int. Cl.
*H04B 7/06* (2006.01)
*H04W 76/27* (2018.01)
(Continued)

(52) U.S. Cl.
CPC ......... *H04B 7/0695* (2013.01); *H04B 7/0626* (2013.01); *H04B 7/088* (2013.01); *H04L 5/0051* (2013.01); *H04W 16/28* (2013.01); *H04W 24/08* (2013.01); *H04W 52/36* (2013.01); *H04W 74/0833* (2013.01); *H04W 76/27* (2018.02); *H04W 80/02* (2013.01)

(58) Field of Classification Search
None
See application file for complete search history.

(56) References Cited

U.S. PATENT DOCUMENTS 10,855,359 B2 * 12/2020 Zhou .................. H04W 52/367
2015/0382205 A1    12/2015 Lee et al.
(Continued)

OTHER PUBLICATIONS

Huawei, et al., Procedure details for beam failure recovery, R1-1709930, 3GPP TSG RAN WG1 NR Ad Hoc Meeting, Qingdao, China, Jun. 27-30, 2017.
(Continued)

*Primary Examiner* — Anh Vu H Ly

(57) ABSTRACT

Systems, methods, and apparatus for connection re-configuration upon beam recovery are disclosed. An example method performed by a network node includes determining that a successful beam recovery has occurred with a wireless device. The network node determines one or more transmission parameters associated with the successful beam recovery, where the one or more transmission parameters are for re-configuring the wireless device. The network node transmits the one or more transmission parameters to the wireless device.

18 Claims, 11 Drawing Sheets

(51) Int. Cl.
*H04B 7/08* (2006.01)
*H04L 5/00* (2006.01)
*H04W 16/28* (2009.01)
*H04W 24/08* (2009.01)
*H04W 52/36* (2009.01)
*H04W 74/08* (2009.01)
*H04W 80/02* (2009.01)

(56) References Cited

U.S. PATENT DOCUMENTS

| | | | | |
|---|---|---|---|---|
| 2018/0138962 A1* | 5/2018 | Islam | ................... | H04L 5/0032 |
| 2018/0227887 A1* | 8/2018 | Hakola | .................. | H04B 7/022 |
| 2018/0302889 A1* | 10/2018 | Guo | ...................... | H04B 7/088 |
| 2019/0058517 A1* | 2/2019 | Kang | .................... | H04L 5/0048 |
| 2019/0089447 A1* | 3/2019 | Sang | .................... | H04W 40/16 |
| 2019/0280756 A1* | 9/2019 | Fan | ...................... | H04B 7/0617 |
| 2020/0059867 A1* | 2/2020 | Haghighat | .......... | H04W 52/367 |
| 2020/0245395 A1* | 7/2020 | Zhang | .................. | H04L 5/0053 |
| 2020/0374960 A1* | 11/2020 | Deenoo | ................ | H04W 72/14 |

OTHER PUBLICATIONS

Nokia, et al., Multi-beam control channel transmission, R1-1708909, 3GPP TSG RAN WG1#89 Hangzhou, P.R. China, May 15-19, 2017.
ZTE, Discussion on beam recovery mechanism, R1-1710185, 3GPP TSG RAN WG1 NR Ad-Hoc#2, Qingdao, P.R. China, Jun. 27-30, 2017.
Huawei, et al., Beam failure recovery, R1-1708135, 3GPP TSG RAN WG1 Meeting #89, Hangzhou, China, May 15-19, 2017.

* cited by examiner

Example Configurations of an SS Burst Set

CONNECTION RE-CONFIGURATION UPON BEAM RECOVERY RESPONSE This application is a 371 of International Application No. PCT/IB2018/056050, filed Aug. 10, 2018, which claims the benefit of U.S. Application No. 62/544,641, filed Aug. 11, 2017, the disclosures of which are fully incorporated herein by reference.

RELATED APPLICATIONS

The present application claims the benefit of priority from U.S. Provisional Application No. 62/544,641 entitled "Connection Re-Configuration Upon Beam Recovery Response" filed Aug. 11, 2017, the disclosure of which is hereby incorporated herein in its entirety by reference.

TECHNICAL AREA

The present disclosure relates, in general, to wireless communication systems such as cellular networks, and more particularly, to methods, user equipment, and network nodes for performing connection re-configuration.

BACKGROUND

In the Long-Term Evolution (LTE) standard, until Release 13, the reference signals that a user equipment (UE) used for the Channel State Information (CSI), Cell-Specific Reference Signal (CRS), and Channel State Information Reference Signal (CSI-RS) were not pre-coded. The UE was able to measure the raw channel and calculated feedback including the preferred precoding matrix. As the number of transmitter (Tx) antennas have increased, however, the amount of feedback has also increased.

In Release 10 (Rel-10), when support for 8Tx closed loop precoding was introduced, a double codebook approach was introduced where the UE first selected a wideband coarse precoder and then selected per subband a second codeword. Another possible approach was for the network to beamform the reference signal and for the UE to calculate feedback on top of the reference signal. This approach was adopted in Rel-13 and was one option provided in the Full-Dimension Multiple-Input Multiple-Output (FD-MIMO) specification, as described in the following section.

Beamformed Reference Signals in LTE

The Rel-13 FD-MIMO specification in LTE supports an enhanced CSI-RS reporting called Class B for beamformed CSI-RS. In the FD-MIMO specification, an LTE RRC_CONNECTED UE can be configured with K beams (where 8>K>1) where there can be 1, 2, 4, or 8 port number for each beam. For CSI feedback purposes, such as providing a Precoding Matrix Indicator (PMI), Rank Indicator (RI) and Channel Quality Indicator (CQI), there is a CSI-RS Resource Indicator per CSI-RS. As shown in FIG. 1, the UE report Channel State Information Reference Signal Index (CRI) indicates the preferred beam, where the CRI is wideband, RI/CQI/PMI is based on legacy codebook (i.e. Rel-12), and the CRI reporting period is an integer multiple of the RI. For Rel-14 Enhanced Full-Dimension Multiple-Input Multiple-Output (eFD-MIMO), aperiodic CSI-RS was introduced with two different sub-flavors. The CRS-RS resources are configured for the UE as in Rel-13 and the set of K CSI-RS resources is configured to work as aperiodic or semipersistent. The UE waits for MAC (Medium Access Control) Coverage Enhancement (CE) activation for N out of K CSI-RS resources. For aperiodic CSI-RS, before reporting the UE waits for a Downlink Control Information (DCI) activation of the CSI-RS resource, in addition to the MAC CE. For semi-persistent CSI-RS, the UE considers the CSI-RS activated after receiving the MAC CE.

The MAC CE activation/deactivation command is specified in TS36.321 where Section 5.19 describes:

The network may activate and deactivate the configured CSI-RS resources of a serving cell by sending the Activation/Deactivation of CSI-RS resources MAC control element described in subclause 6.1.3.14. The configured CSI-RS resources are initially deactivated upon configuration and after a handover.

Section 6.1.3.14 in view of FIGS. 2A and 2B states:

The Activation/Deactivation of CSI-RS resources MAC control element is identified by a MAC PDU subheader with LCID as specified in table 6.2.1-1. It has variable size as the number of configured CSI process (N) and is defined in FIG. 6.1.3.14-1. Activation/Deactivation CSI-RS command is defined in FIG. 6.1.3.14-2 and activates or deactivates CSI-RS resources for a CSI process. Activation/Deactivation of CSI-RS resources MAC control element applies to the serving cell on which the UE receives the Activation/Deactivation of CSI-RS resources MAC control element.

The Activation/Deactivation of CSI-RS resources MAC control elements is defined as follows:

$R_i$: this field indicates the activation/deactivation status of the CSI-RS resources associated with CSI-RS-ConfigNZPId i for the CSI-RS process. The $R_i$ field is set to "1" to indicate that CSI-RS resource associated with CSI-RS-ConfigNZPId i for the CSI-RS process shall be activated. The $R_i$ field is set to "0" to indicate that the CSI-RS-ConfigNZPId i shall be deactivated.

The MAC activation was introduced in LTE to configure more CSI-RS resources for a UE, as the MAC CE would selective activate up to the max CSI-RS resources supported by the UE. Then, without the need to re-configure by RRC, the network could activate another set among the resources configured for the UE.

Beam Forming in NR

For New Radio (NR), reference signals may be beamformed. In NR, the synchronization sequences (Primary Synchronization Signal (NR-PSS)/Secondary Synchronization Signal (NR-SSS)) and Physical Broadcast Channel (PBCH) which includes Demodulation Reference Signal (DMRS) constitutes an SS Block. An RRC_CONNECTED UE trying to access a target cell assumes that the SS Block may be transmitted in the form of repetitive bursts of SS Block transmissions (denoted "SS Burst"), wherein such a burst consists of a number of SS Block transmissions following close after each other in time. Furthermore, a set of SS Bursts may be grouped together (denoted "SS Burst Set"), where the SS Bursts in the SS Burst Sets are assumed to have some relation to each other. Both SS Bursts and SS Burst Sets have their respective given periodicity. In the single beam scenarios, the network could configure time-repetition within one SS Burst in a wide beam. In multi-beam scenarios, at least some of these signals and physical channels (e.g., SS Block) would be transmitted in multiple beams, which could be done in different manners depending on network implementation, as shown in FIG. 1.

FIG. 3 illustrates three example configurations of an SS Burst set. The top example illustrates a time-repetition within one SS Burst in a wide beam. The middle example represents a beam-sweeping of a small number of beams using only one SS Burst in the SS Burst set. The bottom example illustrates a beam-sweeping of a larger number of beams using more than one SS Burst in the SS Burst Set to form a complete sweep. Which of these three alternatives to implement is a network vendor choice. That choice depends on the tradeoff between i) the overhead caused by transmitting periodic and always on narrow beam sweepings vs. ii) the delays and signaling needed to configure the UE to find a narrow beam for Physical Downlink Shared Channel (PDSCH)/Physical Downlink Control Channel (PDCCH). The implementation shown in the upper figure prioritizes i), while the implementation shown in the bottom figure prioritizes ii). The figure in the middle case is an intermediate case, where a sweeping of wide beams is used. In that case the number of beams to cover the cell is reduced, but in some cases an additional refinement is needed for narrow gain beamforming of PDSCH.

It is likely that network vendors will provide cell coverage with a low number of beams for the IDLE mode coverage which will imply a fairly low number of SS Blocks per Burst Set. Hence, once the UE accesses a cell, either via state transition to CONNECTED or via handovers, further beam management procedures need to be configured and Downlink (DL) beams to be used for the transmission of PDCCH/PDSCH may need to be further refined. For that purpose, Radio Access Network 1 (RAN1) is defining in NR a CSI-RS framework, to certain extent similar to LTE, for the beam management and CSI acquisition procedures or Transmission Point (TRP) recognition in same cell ID scenarios. The same cell ID scenario is equivalent to one of the LTE Coordinated Multipoint (CoMP) scenarios where concept of (LTE) transmission point (TP) was introduced. A TP/TRP is basically a remote radio head (RRH) and all RRHs have same cell ID within one cell area. This means that they all send the same CRS (in LTE) or SSB (in NR) and therefore CSI-RS is the only means for the UE the separate a TP/TR.

NR has also adopted the terminology of aperiodic and semi persistent CSI-RS as well as aperiodic and semi-persistent CSI reporting that may happen from periodic, semipersistent or aperiodic CSI-RS with certain limitations.

Beam Failure Detection and Beam Recovery Procedure

In NR, in order to improve coverage and increase data rate, beamforming is widely used. With beamforming, network can transmit user specific data via narrow beam which can improve SINR. One issue with beam-based transmission is that since beams can provide quite narrow coverage, it is possible that suddenly UE is out of the coverage of the beam. If that occurs, the network would not be able to efficiently schedule data to that UE and/or the UE would not be monitoring the right beam (or beam link pair) used by the network to transmit a control channel (like PDCCH) and the UE would not be able to detect scheduled information. That problem is typically called "beam failure."

3GPP has acknowledged the importance of that problem and started to discuss for 5G a procedure called beam recovery upon the detection of a beam failure for RRC_CONNECTED UEs. In beam recovery, an RRC_CONNECTED UE would perform measurements associated to the quality of the serving link and, if that quality goes below a given threshold, the UE would perform beam recovery. The procedure aims to solve the situation where the TX and/or RX beams of the gNodeB and the UE have become misaligned, but where there are additional beams that could be used to maintain the connection between the gNodeB and the UE. The beam failure recovery procedure includes the following aspects:

Beam failure detection: The UE monitors a certain periodic reference signal (RS) to estimate the quality of the serving link. Once the quality of that link falls below a certain threshold, the UE initiates beam recovery.

New candidate beam identification: Once beam failure has been detected, the UE tries to identify a new beam that would provide adequate quality. The UE then searches for a specific RS, which is transmitted from the same node, but in difference candidate beams. During this search procedure, the UE may also change its RX beam.

Beam failure recovery request: Once a new candidate beam has been found, the UE transmits an Uplink (UL) signal using certain UL resources. The gNodeB is prepared to receive the UL signal in these UL resources, and can determine which candidate beam the UE selected based on the receive UL signal.

Beam failure recovery response: When the gNodeB has received the beam failure recovery request, it sends a DL response to indicate to the UE that it received the request, using the knowledge of the new beam. UE monitors gNodeB (gNB) response for beam failure recovery request. Once the UE has successfully received the response, the beam recovery is complete.

As described above, the last part of the beam failure recovery procedure involves the UE monitoring for a beam failure recovery response after transmitting a request and the network transmission of that confirmation. Concerning the content of that response message or the defined UE monitoring behavior of that message, RAN1 has only agreed on the following:

(RAN1 NR AdHoc #1) Support transmission of DL signal for allowing the UE to monitor the beams for identifying new potential beams;
  FFS: Transmission of a beam swept control channel is not precluded;
  This mechanism(s) should consider tradeoff between performance and DL signaling overhead;
(RAN1 #88-bis) UE monitors gNB response for beam failure recovery request;
(RAN1 #88-bis) UE monitors a control channel search space to receive gNB response for beam failure recovery request;
  FFS: the control channel search space can be same or different from the current control channel search space associated with serving BPLs
  FFS: UE further reaction if gNB does not receive beam failure recovery request transmission
(RAN1 #89) FFS Contention-based Physical Random Access Channel (PRACH) resources as supplement to contention-free beam failure recovery resources
(RAN1 #89) To receive gNB response for beam failure recovery request, a UE monitors NR PDCCH with the assumption that the corresponding PDCCH DM-RS is spatial QCL'ed with RS of the UE-identified candidate beam(s)
  FFS whether the candidate beam(s) is identified from a pre-configured set or not
  Detection of a gNB's response for beam failure recovery request during a time window is supported
  FFS the time window is configured or pre-determined
  FFS the number of monitoring occasions within the time window
  FFS the size/location of the time window
  If there is no response detected within the window, the UE may perform re-tx of the request (FFS details)
  If not detected after a certain number of transmission(s), UE notifies higher layer entities FFS the number of transmission(s) or possibly further in combination with or solely determined by a timer NR Beam Recovery Procedure Based on RACH Beam recovery shares some similarities with a random access procedure in the sense that the UE selects a beam that is associated to a cell and, the beam is also associated to certain time, frequency and sequence resources. The sequence in that case, is the one sent to indicate the DL beam the UE has selected, and possibly the UE (if a dedicated preamble). After sending the preamble the UE also expects a response, as in beam recovery. Similarly, the UE can also perform the beam selection based on CSI-RS or SS and RACH can be configured to either of these. Hence, although beam recovery is not defined, it is beneficial to describe some aspects of the random access procedure in NR.

An SS Burst Set is either transmitted in wide beams to cover the whole cell or even in a single beam. In the case the SS Burst Set is transmitted in a single wide beam, the handover command contains a RACH configuration for the target cell. Once the UE receives the handover command it will access the target and a random access procedure will be triggered by the UE sending a random access preamble. If directional reciprocity is assumed, the target cell can transmit the Random Access Response (RAR) either by sweeping in multiple directions covering the whole cell until the UE detects and transmits the handover complete message or transmitting the RAR with time repetition (and expects the handover (HO) complete message).

In the case multiple beams are used to transmit the SS Burst Set, the handover command may contain multiple RACH configurations for the target cell, possibly associated with the SS Block beams or groups of SS Block beams from target cell. Once the UE receives the handover command it will select a beam in the target cell, check how it maps to the received RACH configuration per beam and initiate a random access procedure by sending a random access preamble associated with a target cell beam or a group of beams.

FIG. 4 illustrates an example possible mapping from a beam to a RACH configuration. In the illustrated example, each SS Block contains a mapping between RACH configuration and the strongest DL beam transmitting the SS Block. Here, each PRACH occasion/resource is associated with two SS Block beams. Even without directional reciprocity, network implementation enables the target cell to transmit the RAR in the strongest DL beam covering the UE thanks to the mapping between RACH configuration (including the preamble) and the target cell DL beam.

SUMMARY

The examples described in the present disclosure provide connection re-configuration techniques that offer reduced overhead and faster re-configuration, resulting in more efficient beam recovery. Other advantages may be readily apparent to one having skill in the art. Certain embodiments may have none, some, or all of the recited advantages.

An example method at a network node for connection re-configuration upon beam recover includes determining that a successful beam recovery has occurred with a wireless device. The method further includes determining one or more transmission parameters associated with the successful beam recovery, the one or more transmission parameters for re-configuring the wireless device. The method further includes transmitting the one or more transmission parameters to the wireless device.

An example method at a wireless device for connection re-configuration upon beam recovery includes receiving one or more transmission parameters from a network node, where the one or more transmission parameters are associated with a successful beam recovery. The method further includes implementing the one or more transmission parameters received from the network node.

An example network node includes processing circuitry configured to determine that a successful beam recovery has occurred and determine one or more transmission parameters associated with the successful beam recovery, where the one or more transmission parameters for re-configuring a wireless device. The network node further includes an interface operably coupled to the processing circuitry, where the interface is configured to transmit the one or more transmission parameters to the wireless device.

An example wireless device includes an interface configured to receive one or more transmission parameters from a network node, where the one or more transmission parameters are associated with a successful beam recovery. The wireless device further includes processing circuitry operably coupled to the interface, where the processing circuitry is configured to implement the one or more transmission parameters received from the network node.

In yet other examples, a system including the user equipment and/or network node are provided that perform the above methods. Further, the present disclosure also provides a non-transitory computer-readable medium comprising computer instructions stored thereon that, when executed by a processing circuit, cause the processing circuit to perform the above methods.

BRIEF DESCRIPTION OF THE DRAWINGS

For a more complete understanding of the disclosed embodiments and their features and advantages, reference is now made to the following description, taken in conjunction with the accompanying drawings.

DETAILED DESCRIPTION

Figure 1:
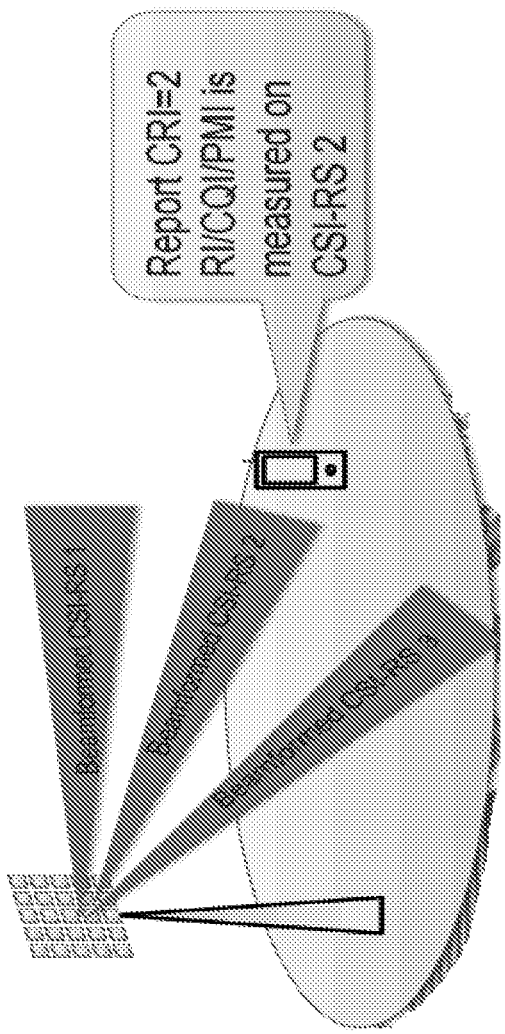
FIG. 1 illustrates a wireless communication network including beamformed CSI-RS according to embodiments of the present disclosure.

There are a number of technical issues associated with conventional beam recovery response techniques. For example, potential changes being discussed relate to beam recovery from a physical layer perspective, and include techniques for allowing the network to determine the best DL beam for continuing scheduling relating to the UE, such as scheduling of transmitting control channels. The discussions, however, do not address any re-configuration of parameters upon a successful beam recovery or provide techniques for performing such re-configuration.

Embodiments of the present disclosure overcome technical issues relating to connection re-configuration upon beam recovery response, among other technical issues. For example, embodiments of the present disclosure describe systems and methods related to a beam failure recovery response message that can be used to perform parameter re-configuration. In some embodiments, this beam failure recovery response message is used along with previously received messages that contain complementary information and/or determinations based on the associated UE behavior. Moreover, in some embodiments, the technique includes providing a configuration of sets of CSI-RS configuration for beam management in a target cell, and the target node selects one of these configurations based on the UE PRACH preamble.

Certain embodiments consist of a method where the network can configure (or re-configure) a UE with transmission parameters (or inform that some parameters should be kept) upon the detection of a successful beam recovery. After beam recovery, network knows the new DL Tx beam it should use to contact the UE, the one(s) that the UE should also monitor (for PDCCH monitoring, for example) so the network can also adjust one or a set of transmission parameters that may be affected by the fact that the UE has recovered its beam(s) and re-configure the UE accordingly.

In some embodiments, the re-configuration upon beam recovery that is a full and/or delta re-configuration message, which can either be a Radio Resource Control (RRC) Connection Re-configuration or a MAC CE message containing the new parameters to be used and/or previously configured and activated parameters that can remain active.

In another embodiment, the UE first receives a list of candidate re-configurations which are indexed (e.g. by an integer value) and one or a subset of these can be further activated by the re-configuration upon beam recovery. For example, the subset could include an index to a previously received configuration, which can be activated after beam recovery to take into account a change of a beam.

In some embodiments, there are different types of re-configurations including re-configurations relating to RLM, beam failure detection, beam recovery request transmission, monitoring of beam recovery response, measurement configuration(s), cell quality derivation parameters, other parameters such as DMRS and/or any other scrambling code(s), among others.

Different schemes may be used for certain embodiments such as: RRC messages for the full and/or delta re-configuration or for the list of re-configurations and indexes; and MAC CE messages for the activation of previously provided configurations. In some embodiments, in a recovery response message a MAC CE message can be given for the activation of previously provided configurations.

Certain embodiments of the present disclosure may provide additional technical advantages, such as that the UE can be re-configured to use a new set of parameters upon beam recovery where these parameters can be related to the new DL beam being used by the network to contact the UE. An advantage of certain embodiments may include an optimization to speed up that re-configuration and/or reduce the overhead caused by RRC signaling by allowing the network to use a MAC CE to activate a particular configuration selected based on the new best beam the UE has selected and indicated via beam recovery request. Accordingly, in addition to providing new functionality for UE re-configuration that previously did not exist, these techniques provide advantages of reduced overhead and faster re-configuration, resulting in more efficient beam recovery. Certain embodiments may have none, some, or all of the recited advantages, and other technical advantages may be readily apparent to one having skill in the art.

The technology described herein can be used in various wireless systems and is not restricted to 3GPP EUTRA/LTE systems and 3GPP Next Generation systems (also referred to as the 5G system or 5GS) deploying New Radio (NR), even though such systems will serve as examples. Moreover, different types of re-configurations could be performed due to the change of a DL Tx and/or Rx beam(s), which could either be single beam(s) and/or beam link pair(s) (BPL)(s). Example re-configurations include Radio Link Monitoring (RLM) related configuration (e.g. either the RS type or, in the case of CSI-RS, the resource(s) to be monitored, the periodicities, beams, etc.), measurement configuration (for example, in the case of CSI-RS based measurements, to take into account activation of new resources and/or requests for monitoring by the UE), changes to scrambling codes (e.g. UE-specific DMRS), beam failure detection configuration, and beam recovery configuration, among others.

Figure 5:
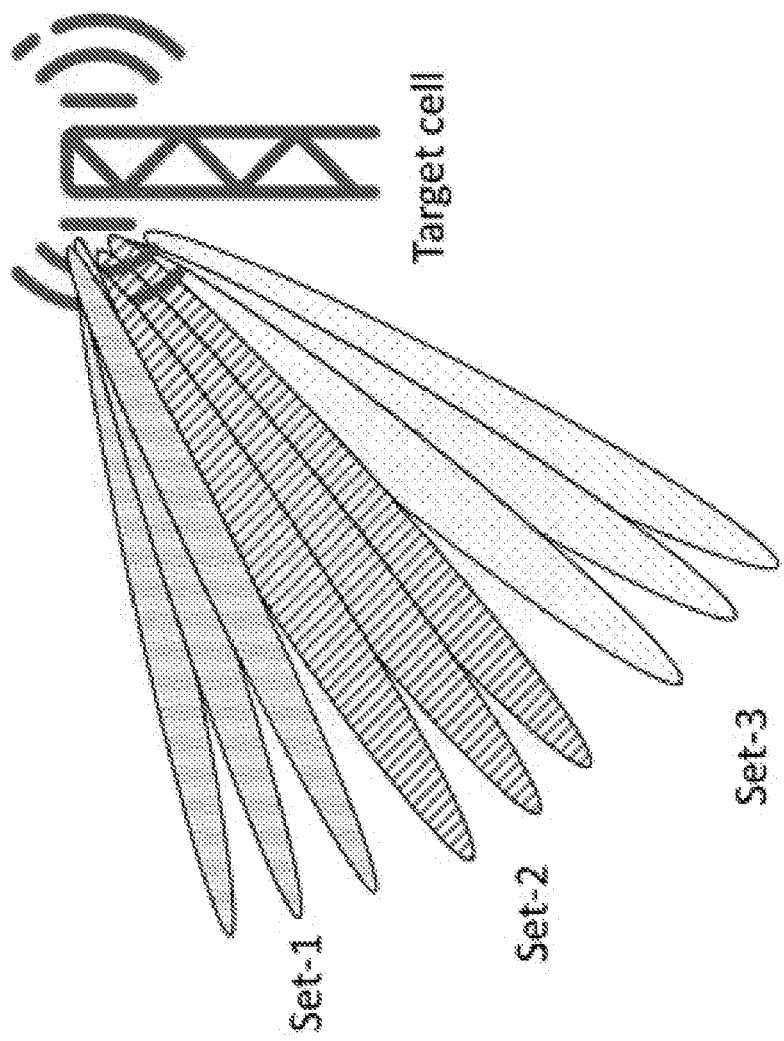
FIG. 5 illustrates sets of CSI-RS resources associated with DL beams according to embodiments of the present disclosure.

FIG. 5 illustrates example set(s) of CSI-RS associated with DL beams. In the illustrated embodiment, the UE is connected to that cell whose strongest beam detected by the UE was associated to SS Block-A. Hence, beam management is performed based on beam measurements and reports of a set of CSI-RS resources associated to DL beams in set-1, as shown in FIG. 5.

Figure 6:
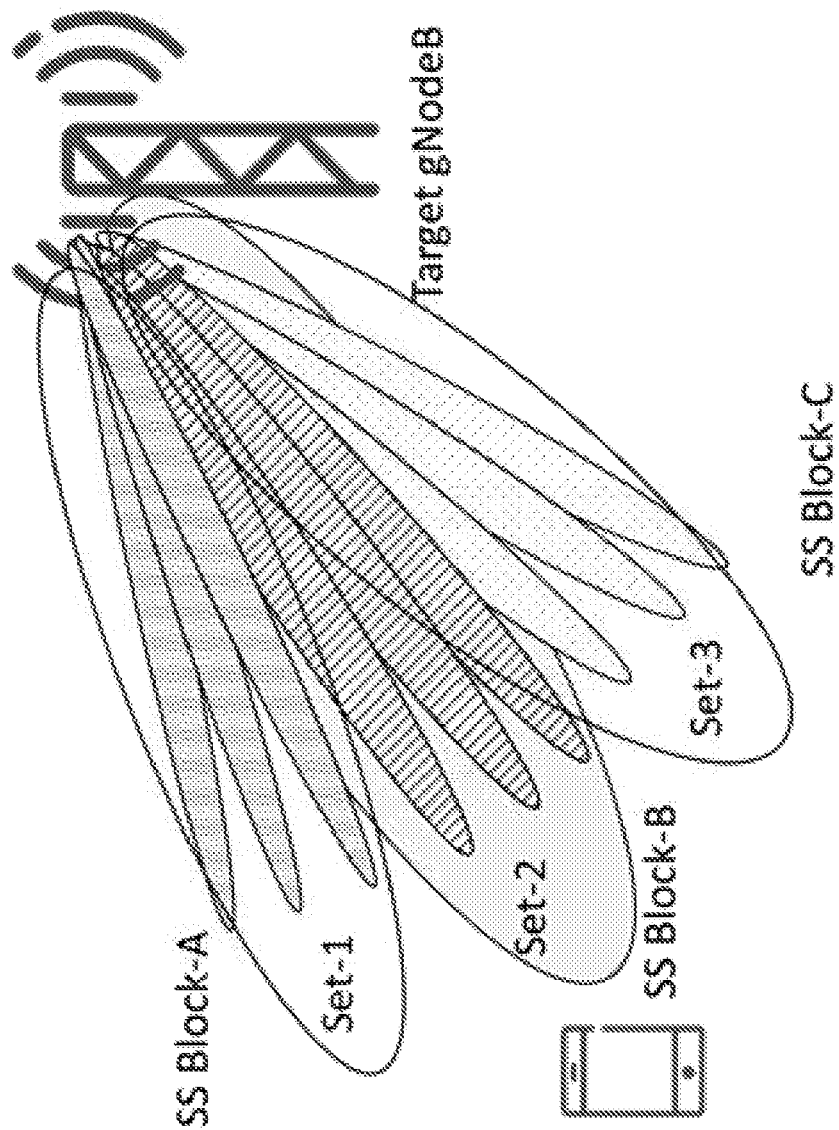
FIG. 6 illustrates a re-configuration of CSI-RS parameters for beam management according to embodiments of the present disclosure.

FIG. 6 illustrates re-configuration of CSI-RS parameters for beam management. As shown in FIG. 6, if the UE detects beam failure and performs beam selection it determines that SS Block-B is the strongest and, upon selecting these and successfully performing beam recovery, the UE determines to not measure and report beams using set-1, but instead measure and report beams using set-2. The change of set-1 to set-2 is a re-configuration of CSI-RS parameters for beam management, and in some embodiments is similar to techniques for re-configuration corresponding to CSI acquisition, link adaptation, among others. Accordingly, as illustrated in the example embodiment of FIG. 6, the UE selects the SS Block-B as its best DL beam and sends the RACH preamble associated to this best DL beam and the target gNodeB identifies that UE is under the coverage of SS Block-B. In some examples, a best beam is determined by identifying a beam with a highest Signal-to-Noise (SNR) ratio or having another objective indicia of high signal quality.

Figure 7:
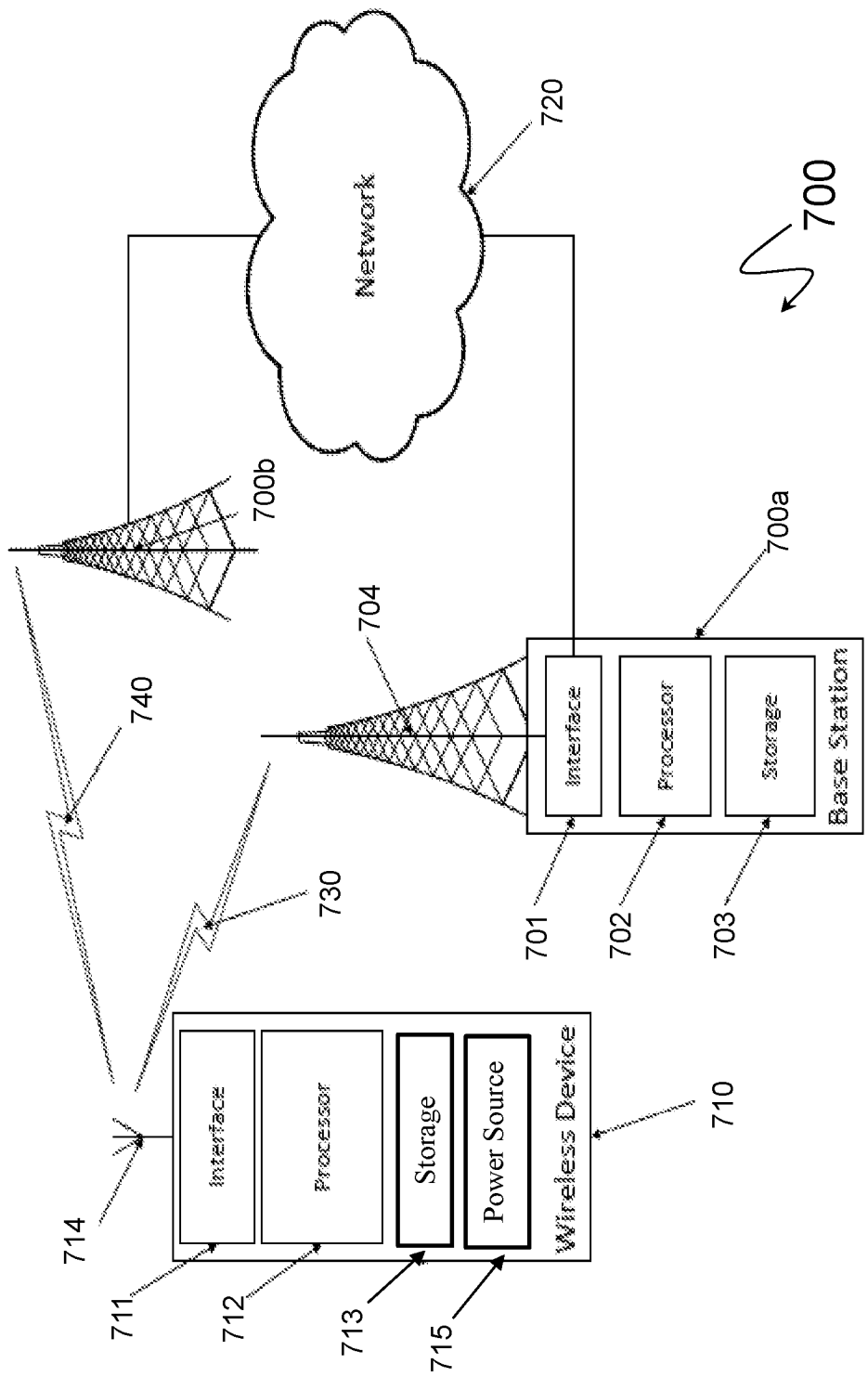
FIG. 7 illustrates a schematic diagram of a wireless communication network according to embodiments of the present disclosure.

FIG. 7 is a schematic diagram of a wireless communication network 700, in accordance with certain embodiments.

In the illustrated embodiment, FIG. 7 includes network 720, network nodes 700a-b, and wireless device 710. Wireless device 710 may be interchangeably referred to as user equipment (UE) 710. In different embodiments, the wireless network may comprise any number of wired or wireless networks, network nodes, base stations (BS), controllers, wireless devices, relay stations, and/or any other components that may facilitate or participate in the communication of data and/or signals whether via wired or wireless connections.

Network 720 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices. Network node 700a may refer to any kind of network node 700, which may comprise a Node B, base station (BS), radio base station, multi-standard radio (MSR) radio node such as MSR BS, eNode B, network controller, radio network controller (RNC), multi-cell/multicast coordination entity (MCE), base station controller (BSC), relay node, base transceiver station (BTS), access point (AP), radio access point, transmission points, transmission nodes, remote radio unit (RRU), remote radio head (RRH), nodes in distributed antenna system (DAS), core network node (e.g., MSC, MME, SON node, coordinating node, etc.), O&M, OSS, positioning node (e.g., E-SMLC), MDT, an external node (e.g., third-party node, a node external to the current network), or any suitable network node.

Network node 700a comprises interface 701, processor 702, storage 703, and antenna 704. These components are depicted as single boxes located within a single larger box. In practice however, a network node 700a may comprise multiple different physical components that make up a single illustrated component (e.g., interface 701 may comprise terminals for coupling wires for a wired connection and a radio transceiver for a wireless connection). As another example, network node 700a may be a virtual network node in which multiple different physically separate components interact to provide the functionality of network node 700a (e.g., processor 702 may comprise three separate processors located in three separate enclosures, where each processor is responsible for a different function for a particular instance of network node 700). Similarly, network node 700a may be composed of multiple physically separate components (e.g., a NodeB component and a RNC component, a BTS component and a BSC component, etc.), which may each have their own respective processor, storage, and interface components. In certain scenarios in which network node 700a comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 700a may be configured to support multiple radio access technologies (RATs). In such embodiments, some components may be duplicated (e.g., separate storage 703 for the different RATs) and some components may be reused (e.g., the same antenna 704 may be shared by the RATs).

Processor 702 may be a combination of one or more of a microprocessor, controller, microcontroller, central processing unit, digital signal processor, application specific integrated circuit, field programmable gate array, processing circuitry, or any other suitable computing device, resource, or combination of hardware, software and/or encoded logic operable to provide, either alone or in conjunction with other network node 700a components, such as storage 703, network node 700a functionality. For example, processor 702 may execute instructions stored in storage 703. Such functionality may include providing various wireless features discussed herein to a wireless device, such as wireless device 710, including any of the features or benefits disclosed herein.

Storage 703 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 703 may store any suitable instructions, data or information, including software and encoded logic, utilized by network node 700. Storage 703 may be used to store any calculations made by processor 702 and/or any data received via interface 701.

Network node 700a also comprises interface 701, which may be used in the wired or wireless communication of signalling and/or data between network node 700, network 720, and/or wireless device 710. For example, interface 701 may perform any formatting, coding, or translating that may be needed to allow network node 700a to send and receive data from network 720 over a wired connection. Interface 701 may also include a radio transmitter and/or receiver that may be coupled to or a part of antenna 704. The radio may receive digital data that is to be sent out to other network nodes or wireless devices 710 via a wireless connection. The radio may convert the digital data into a radio signal having the appropriate channel and bandwidth parameters. The radio signal may then be transmitted via antenna 704 to the appropriate recipient (e.g., wireless device 710).

Antenna 704 may be any type of antenna capable of transmitting and receiving data and/or signals wirelessly. In some embodiments, antenna 704 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

Wireless device 710 may be any type of wireless endpoint, mobile station, mobile phone, wireless local loop phone, smartphone, user equipment (UE), desktop computer, PDA, cell phone, tablet, laptop, VoIP phone or handset, which is able to wirelessly send and receive data and/or signals to and from a network node, such as network node 700a and/or other wireless devices 710. For example, wireless device 710 may transmit wireless signals to one or more of network nodes 700a-b, and/or receive wireless signals from one or more of network nodes 700a-b. The wireless signals may contain voice traffic, data traffic, control signals, and/or any other suitable information. In some embodiments, an area of wireless signal coverage associated with a network node 700a may be referred to as a cell. In some embodiments, wireless device 710 may have device-to-device (D2D) capability. Thus, wireless device 710 may be able to receive signals from and/or transmit signals directly to another wireless device.

Wireless device 710 comprises interface 711, processor 712, storage 713, antenna 714, and power source 715. Like network node 700, the components of wireless device 710 are depicted as single boxes located within a single larger box, however in practice a wireless device may comprises multiple different physical components that make up a single illustrated component (e.g., storage 713 may comprise multiple discrete microchips, each microchip representing a portion of the total storage capacity).

Interface 711 may be used in the wireless communication of signalling and/or data between wireless device 710 and network node 700. For example, interface 711 may perform any formatting, coding, or translating that may be needed to allow wireless device 710 to send and receive data from network node 700a over a wireless connection. Interface 711 may also include a radio transmitter and/or receiver that may be coupled to or a part of antenna 714. The radio may receive digital data that is to be sent out to network node 700a via a wireless connection. The radio may convert the digital data into a radio signal having the appropriate channel and bandwidth parameters. The radio signal may then be transmitted via antenna 714 to network node 700.

Processor 712 may be a combination of one or more of a microprocessor, controller, microcontroller, central processing unit, digital signal processor, application specific integrated circuit, field programmable gate array, processing circuitry, or any other suitable computing device, resource, or combination of hardware, software and/or encoded logic operable to provide, either alone or in combination with other wireless device 710 components, such as storage 713, wireless device 710 functionality. Such functionality may include providing various wireless features discussed herein, including any of the features or benefits disclosed herein.

Storage 713 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 713 may store any suitable data, instructions, or information, including software and encoded logic, utilized by wireless device 710. Storage 713 may be used to store any calculations made by processor 712 and/or any data received via interface 711.

Antenna 714 may be any type of antenna capable of transmitting and receiving data and/or signals wirelessly. In some embodiments, antenna 714 may comprise one or more omni-directional, sector or panel antennas operable to transmit/receive radio signals between 2 GHz and 66 GHz. For simplicity, antenna 714 may be considered a part of interface 711 to the extent that a wireless signal is being used.

Power source 715 may comprise power management circuitry. Power source 715 may receive power from a power supply, which may either be comprised in, or be external to, power source 715. For example, wireless device 710 may comprise a power supply in the form of a battery or battery pack, which is connected to, or integrated in, power source 715. Other types of power sources, such as photovoltaic devices, may also be used. As a further example, wireless device 710 may be connectable to an external power supply (such as an electricity outlet) via an input circuitry or interface such as an electrical cable, whereby the external power supply supplies power to power source 715. Power source 715 may be electrically coupled to interface 711, processor 712, storage 713, and be configured to supply wireless device 710 with power for performing the functionality described herein.

Figure 8:
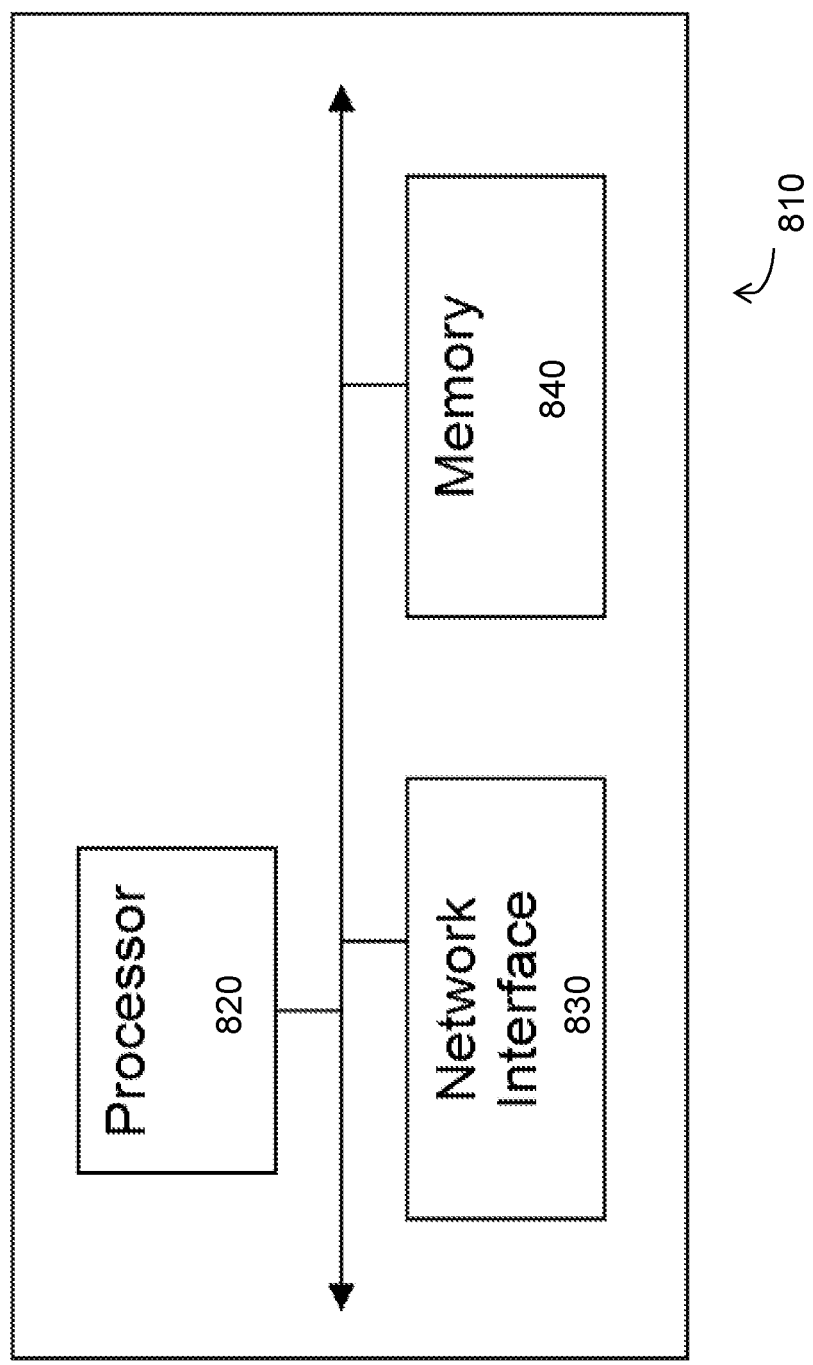
FIG. 8 illustrates a schematic block diagram of an exemplary radio network controller or core network node according to embodiments of the present disclosure.

In certain embodiments, network nodes 700a may interface with a radio network controller. The radio network controller may control network nodes 700a and may provide certain radio resource management functions, mobility management functions, and/or other suitable functions. In certain embodiments, the functions of the radio network controller may be performed by network node 700. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a PSTN, a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof. FIG. 8 describes additional functionality of a radio network controller.

In some embodiments, the core network node may manage the establishment of communication sessions and various other functionalities for wireless device 710. Wireless device 710 may exchange certain signals with the core network node using the non-access stratum (NAS) layer. In non-access stratum signaling, signals between wireless devices 710 and the core network node may be transparently passed through the radio access network. In certain embodiments, network nodes 700a may interface with one or more network nodes over an internode interface. For example, network nodes 700a and 700b may interface over an X2 interface.

Although FIG. 7 illustrates a particular arrangement of a wireless network, the present disclosure contemplates that the various embodiments described herein may be applied to a variety of networks having any suitable configuration. For example, the wireless network may include any suitable number of wireless devices 710 and network nodes 700, as well as any additional elements suitable to support communication between wireless devices or between a wireless device and another communication device (such as a landline telephone). Furthermore, although certain embodiments may be described as implemented in a long-term evolution (LTE) network, the embodiments may be implemented in any appropriate type of telecommunication system supporting any suitable communication standards and using any suitable components, and are applicable to any RAT or multi-RAT systems in which the wireless device receives and/or transmits signals (e.g., data). For example, the various embodiments described herein may be applicable to NR, LTE, LTE-Advanced, UMTS, HSPA, GSM, cdma2000, WiMax, WiFi, another suitable radio access technology, or any suitable FIG. 8 is a schematic block diagram of an exemplary radio network controller or core network node 810, in accordance with certain embodiments. In some embodiments a user equipment or wireless device may have a similar structure. Examples of network nodes can include a mobile switching center (MSC), a serving GPRS support node (SGSN), a mobility management entity (MME), a radio network controller (RNC), a base station controller (BSC), and so on. The radio network controller or core network node 810 includes processor 820, memory 830, and network interface 840. In some embodiments, processor 820 executes instructions to provide some or all of the functionality described above as being provided by the network node, memory 830 stores the instructions executed by processor 820, and network interface 840 communicates signals to any suitable node, such as a gateway, switch, router, Internet, Public Switched Telephone Network (PSTN), network nodes 100, radio network controllers or core network nodes 810, etc.

Processor 820 may include any suitable combination of hardware and software implemented in one or more modules to execute instructions and manipulate data to perform some or all of the described functions of the radio network controller or core network node 810. In some embodiments, processor 820 may include, for example, one or more computers, one or more central processing units (CPUs), one or more microprocessors, one or more applications, and/or other logic.

Memory 830 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 840 is communicatively coupled to processor 820 and may refer to any suitable device operable to receive input for the network node, send output from the network node, perform suitable processing of the input or output or both, communicate to other devices, or any combination of the preceding. Network interface 840 may include appropriate hardware (e.g., port, modem, network interface card, etc.) and software, including protocol conversion and data processing capabilities, to communicate through a network.

Other embodiments of the network node may include additional components beyond those shown in FIG. 8 that may be responsible for providing certain aspects of the network node's functionality, including any of the functionality described above and/or any additional functionality (including any functionality necessary to support the embodiments described above).

Figure 9:
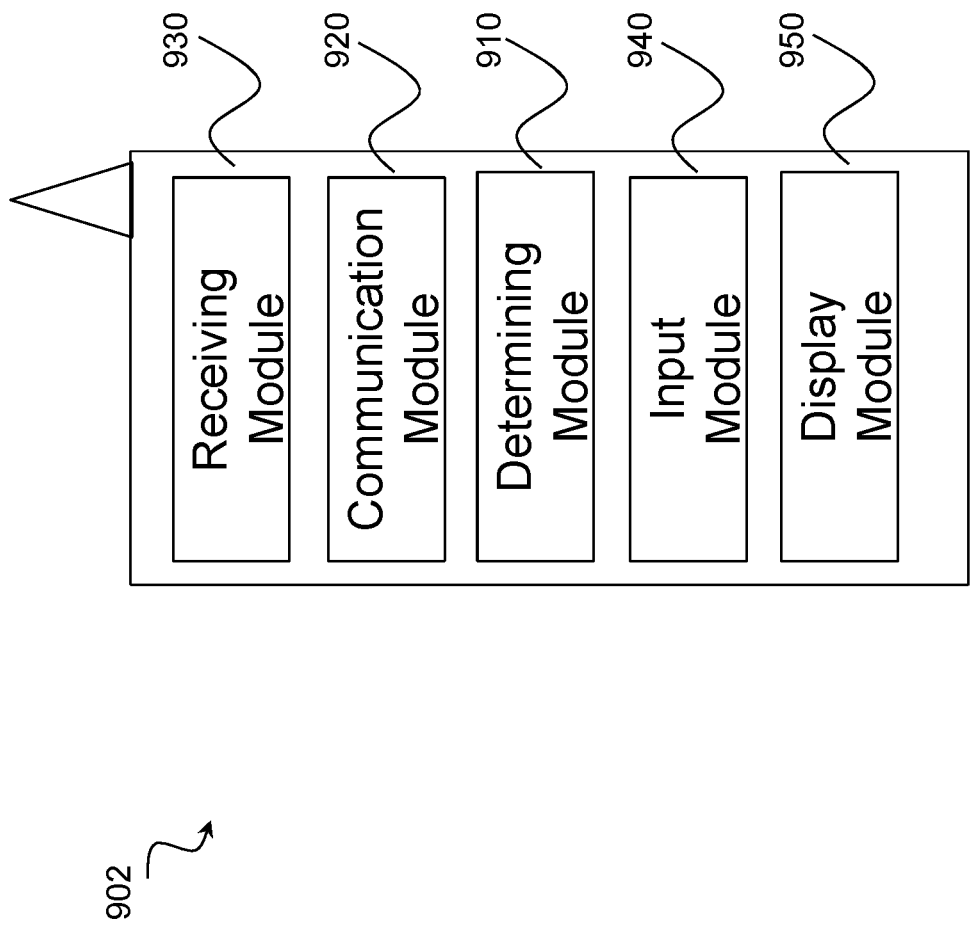
FIG. 9 illustrates a schematic block diagram of a wireless device according to embodiments of the present disclosure.

FIG. 9 is a schematic block diagram of an exemplary wireless device 902, in accordance with certain embodiments. Wireless device 902 may include one or more modules. For example, wireless device 902 may include a determining module 910, a communication module 920, and a receiving module 930. Optionally, wireless device 902 may include an input module 940, a display module 950, and any other suitable modules. Wireless device 902 may perform one or more of the embodiments described herein.

Determining module 910 may perform the processing functions of wireless device 902. In one example embodiment, determining module 910 may determine that it has received one or more transmission parameters associated with a successful beam recovery and implement the one or more transmission parameters for re-configuration.

Determining module 910 may include or be included in one or more processors, such as processor 112 described above in relation to FIG. 7. Determining module 910 may include analog and/or digital circuitry configured to perform any of the functions of determining module 910 and/or processor 112 described above. The functions of determining module 910 described above may, in certain embodiments, be performed in one or more distinct modules.

Communication module 920 may perform the communication functions of wireless device 902. In certain embodiments, communication module 920 may perform any of the communication functions described herein. Communication module 920 may include a transmitter and/or a transceiver, such as interface 111 and/or antenna 114 described above in relation to FIG. 7. Communication module 920 may include circuitry configured to wirelessly transmit messages and/or signals. In particular embodiments, communication module 920 may receive messages and/or signals for transmission from determining module 910. In certain embodiments, the functions of communication module 920 described above may be performed in one or more distinct modules.

Receiving module 930 may perform the receiving functions of wireless device 902. In certain embodiments, receiving module 930 may perform any of the receiving functions of a wireless device (e.g., wireless device 710). In one example embodiment, receiving module 930 may receive one or more transmission parameters from network node 100 in response to a successful beam recovery. Receiving module 930 may include a receiver and/or a transceiver, such as interface 111 and/or antenna 114 described above in relation to FIG. 7. Receiving module 930 may include circuitry configured to wirelessly receive messages and/or signals. In particular embodiments, receiving module 930 may communicate received messages and/or signals to determining module 910.

Optionally, wireless device 902 may include input module 940. Input module 940 may receive user input intended for wireless device 902. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 910.

Optionally, wireless device 902 may include display module 950. Display module 950 may present signals on a display of wireless device 902. Display module 950 may include the display and/or any appropriate circuitry and hardware configured to present signals on the display. Display module 950 may receive signals to present on the display from determining module 910.

Determining module 910, communication module 920, receiving module 930, input module 940, and display module 950 may include any suitable configuration of hardware and/or software. Wireless device 902 may include additional modules beyond those shown in FIG. 9 that may be responsible for providing any suitable functionality, including any of the functionality described above and/or any additional functionality (including any functionality necessary to support the various embodiments described herein).

Figure 10:
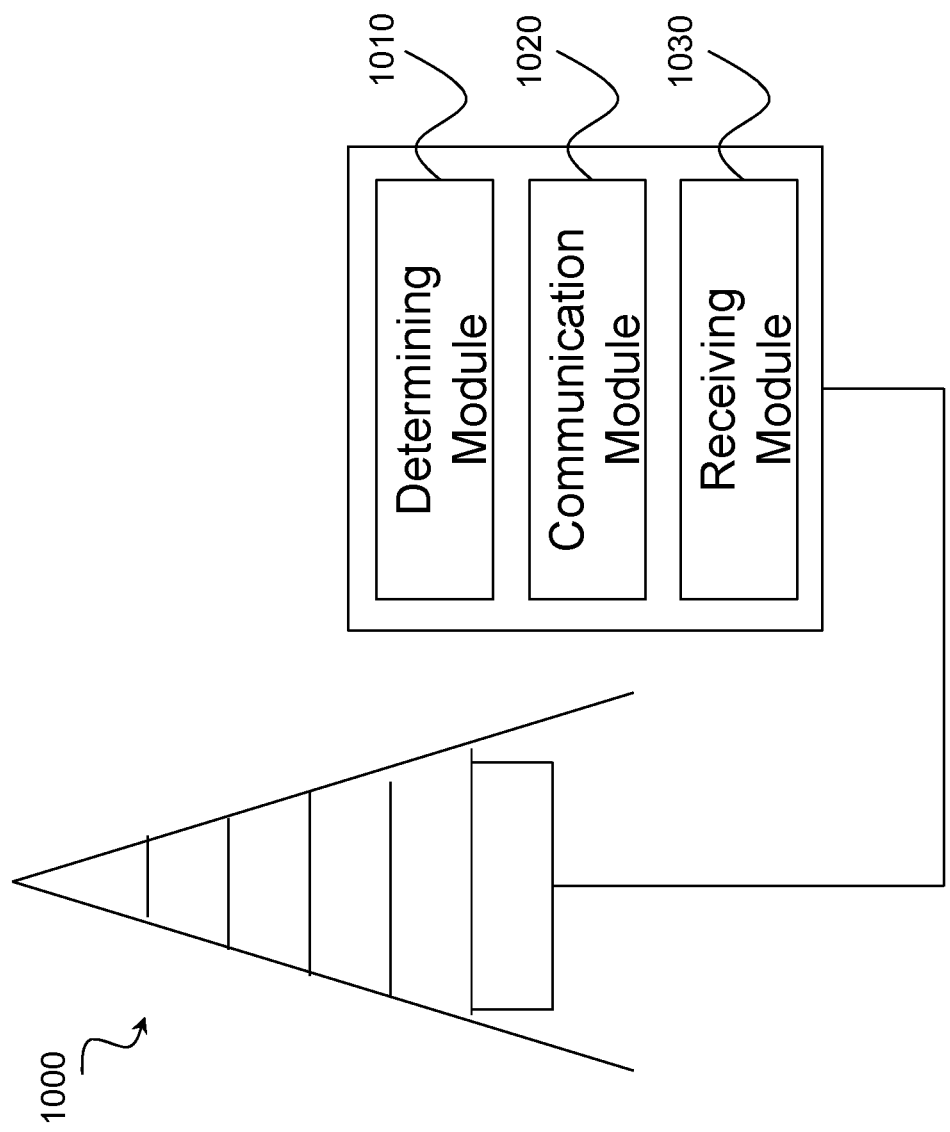
FIG. 10 illustrates a schematic block diagram of a network node according to embodiments of the present disclosure.

FIG. 10 is a schematic block diagram of an exemplary network node 1000, in accordance with certain embodiments. Network node 1000 may include one or more modules. For example, network node 1000 may include determining module 1010, communication module 1020, receiving module 1030, and any other suitable modules. In some embodiments, one or more of determining module 1010, communication module 1020, receiving module 1030, or any other suitable module may be implemented using one or more processors, such as processor 102 described above in relation to FIG. 7. In certain embodiments, the functions of two or more of the various modules may be combined into a single module. Network node 1000 may perform one or more steps performed by network node(s) described herein.

Determining module 1010 may perform the processing functions of network node 1000. In certain embodiments, determining module 1010 may perform any of the functions of network node(s) described herein. In one example embodiment, determining module 1010 may determine that a successful beam recovery has occurred and determine one or more transmission parameters associated with the successful beam recovery.

Determining module 1010 may include or be included in one or more processors, such as processor 102 described above in relation to FIG. 7. Determining module 1010 may include analog and/or digital circuitry configured to perform any of the functions of determining module 1010 and/or processor 102 described above. The functions of determining module 1010 may, in certain embodiments, be performed in one or more distinct modules. For example, in certain embodiments some of the functionality of determining module 1010 may be performed by an allocation module.

Communication module 1020 may perform the transmission functions of network node 1000. In certain embodiments, network node 1000 may perform any of the functions of the network node(s) described herein. In one example embodiment, communication module 1020 may transmit one or more transmission parameters to configure/re-configure wireless device 110 in response to a successful beam recovery.

Communication module 1020 may transmit messages to one or more of wireless devices 110. Communication module 1020 may include a transmitter and/or a transceiver, such as transceiver 1010 described above in relation to FIG. 7. Communication module 1020 may include circuitry configured to wirelessly transmit messages and/or signals. In particular embodiments, communication module 1020 may receive messages and/or signals for transmission from determining module 1010 or any other module.

Receiving module 1030 may perform the receiving functions of network node 1000. In certain embodiments, receiving module 1030 may perform any of the functions of the network node(s) described herein. Receiving module 1030 may receive any suitable information from wireless device 110 Receiving module 1030 may include a receiver and/or a transceiver, such as interface 101 and/or antenna 104, which are described above in relation to FIG. 7. Receiving module 1030 may include circuitry configured to wirelessly receive messages and/or signals. In particular embodiments, receiving module 1030 may communicate received messages and/or signals to determining module 1010 or any other suitable module.

Determining module 1010, communication module 1020, and receiving module 1030 may include any suitable configuration of hardware and/or software. Network node 1000 may include additional modules beyond those shown in FIG. 10 that may be responsible for providing any suitable functionality, including any of the functionality described above and/or any additional functionality (including any functionality necessary to support the various embodiments described herein).

Figure 11:
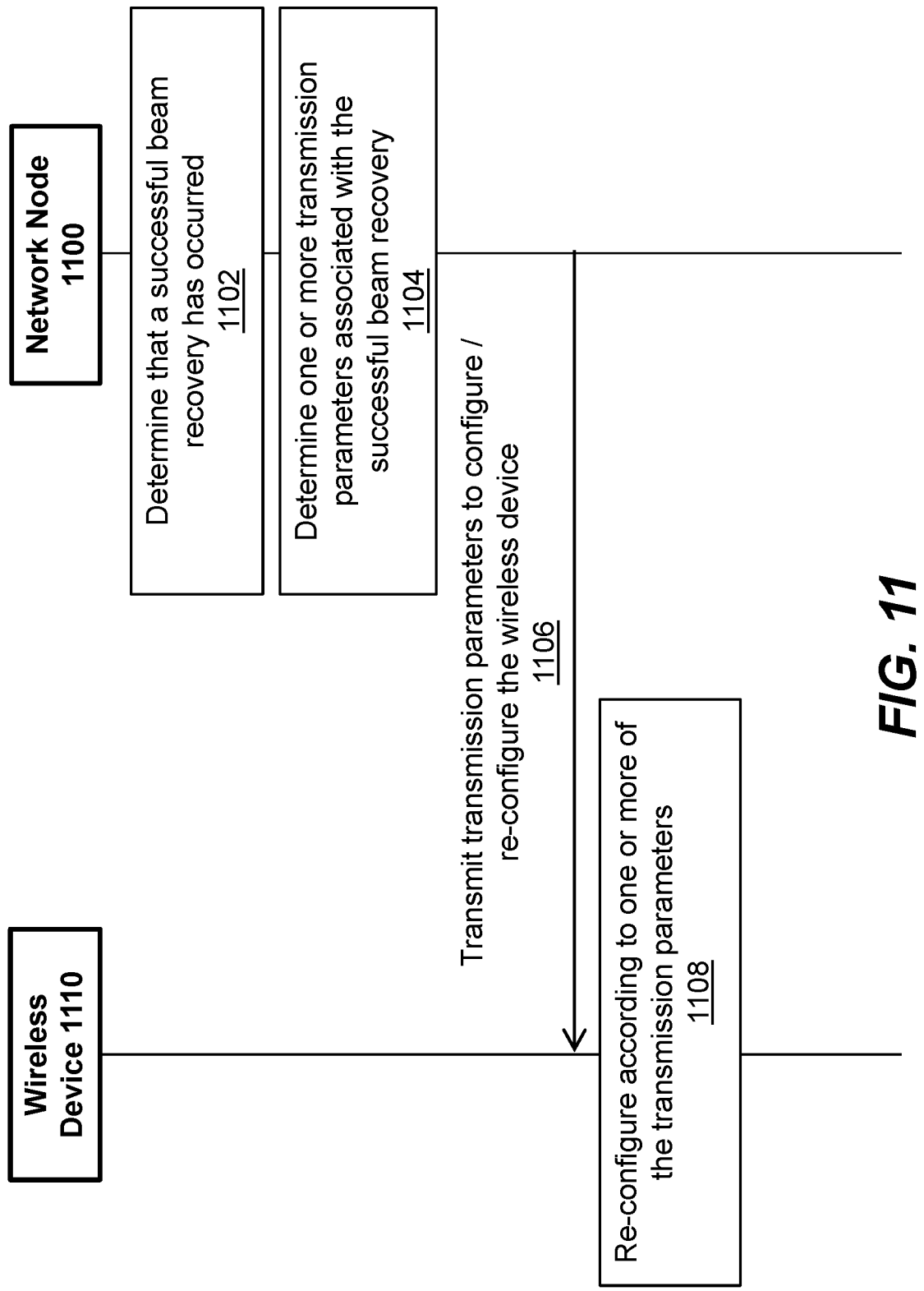
FIG. 11 illustrates a signal flow between a wireless device and a network node according to certain embodiments of the present disclosure.

FIG. 11 illustrates an example of a signal flow between wireless device 1110 and network node 1100. In some examples, wireless device 1110 and network node 1100 are provided by a wireless device 710 and network node 700a as shown in FIG. 7, respectively. In some examples, network node 1100 includes a combination of one or more nodes in the network, such as network nodes 700a and 700b.

At step 1102, network node 1100 determines that a successful beam recovery has occurred. In more detail regarding beam recovery, once recovery is performed subsequent failures can occur and be detected by the wireless device 1110, which can transmit beam recovery requests and receive a response from the network node 1100.

At step 1104, network node 1100 determines one or more transmission parameters corresponding to the beam recovery. Upon beam recovery, the network node 1100 can re-configure the transmission resources of beam recovery requests, such as the time/frequency resources on which the UE may transmit its request and/or the sequence and/or candidate sequence(s) (e.g., Physical Random Access Channel (PRACH) preambles). As additional examples, the network node 1100 can also modify the request method from Physical Uplink Control Channel (PUCCH)-based to PRACH-based or from PRACH-based to PUCCH-based depending on the resource situation of the different areas of the cell (which could even be different TRPs after the selection).

In more detail, certain embodiments may include different beam recovery response parameters. As an example of considerations that may be taken into account in determining the parameters, the beam direction the wireless device 1110 selects may have changed. Accordingly, the network node 1100 may change the RS type to be monitored (which could either be the same as in RLM or different), one or multiple thresholds for the number of events that trigger beam failure detection (e.g. number of out-of-sync events generated based on radio link quality based on certain monitored beam), periodicities, monitored beam and/or beam link pair(s). Moreover, when the network node 1100 indicates that the wireless device 1110 should remain monitoring CSI-RS resources for that purpose, the network can re-configure the resources to be monitored (based on the fact the direction has changed), the Rx beam(s) to be used for monitoring, and any other criteria to trigger sub-sequent beam failure detection.

In another example, because beam recovery failures can occur, the network node 1100 may determine to re-configure failure related parameters for the wireless device 1110 such as the maximum number of attempts, power ramping parameters, beam switching parameters, reception window, among others. In certain embodiments, different cell quality derivation parameters can be used after beam recovery, such as the maximum number of beams to compute cell quality and the absolute threshold for selecting beams other than the best for the average that computes cell quality. For example, the wireless device 1110 may be in an area covered by a given cell (and having a certain distribution of neighbor cells and/or beams from neighbor cells) so that the usage of an average with a certain maximum number of beams is suitable but after recovering and having another best beam (or best beam link pair(s)) the network node 1100 may find it more suitable and/or optimized to use the best beam only or reduce the number of beams. These could be a modification of an existing measurement object or even the addition or removal of that (assuming that cell quality parameters are derived based on that).

Certain embodiments may utilize one or more different beam reporting mechanisms e.g., RSRP, CSI reporting or CSI-like. The wireless device 1110 may have an activated configuration to report CSI but, after failure, it recovers by selecting a beam (e.g. based on CSI-RS) from another TRP that has a different load and/or beamforming capabilities. Hence, the network node 1100 may determine to activate the reporting of RSP (or equivalently less granular and lower overhead metric).

In some embodiments there are different RS Type per reportConfig for RRM measurements. The wireless device 1110 may activate CSI-RS based measurements for cell measurement results with the purpose to trigger event-based measurement reporting. However, after selecting another beam recovery, and selection to another beam, the network node 1100 may determine to re-configure the wireless device 1110 to use another RS type (e.g., SS Block based RS, such as NR-SSS or DRMS of PBCH) that may be useful if the wireless device 1110 selects a beam from a TRP close to an area where CSI-RS neighbor cell configurations are either unknown to the wireless device 1110 or to a serving gNodeB.

Additional examples of parameters that may be determined and transmitted are described in more detail below with respect to step 1106. At step 1106, network node 1100 transmits one or more transmission parameters to configure/re-configure wireless device 1110. In some examples, the re-configuration upon beam recovery includes a transmission of a full and/or delta re-configuration message, which can either be an RRC Connection Re-configuration or a MAC CE message containing the new parameters to be used and/or indicate previously configured and activated parameters that can remain active. The wireless device 1110 can expect an RRC Connection Re-configuration message (without mobilityControlInfo, for example, if recovery occurs within the same PCell) after a beam recovery containing a full and/or delta configuration. There can also be a specific message defined for the purpose of re-configuring the UE upon beam recovery, such as a new RRC message, or a MAC CE message, or any MAC like message.

Figure 2A:
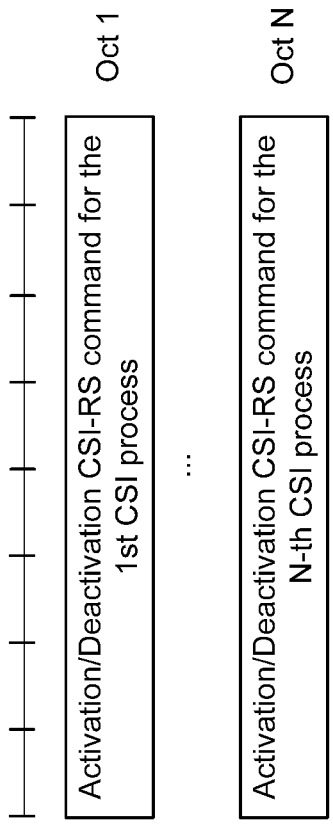
FIG. 2A illustrates a MAC control element for activation/deactivation of CSI-RS resources according to embodiments of the present disclosure.
Figure 2B:
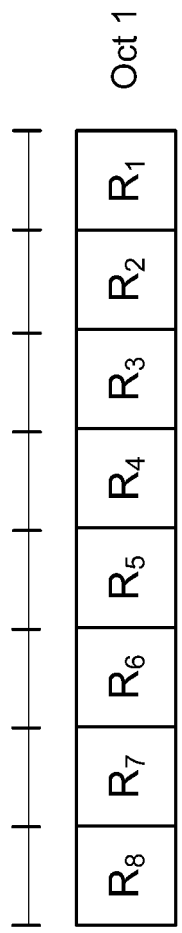
FIG. 2B illustrates an octet that includes bit indicators corresponding to a set of CSI-RS according to embodiments of the present disclosure.
Figure 3:
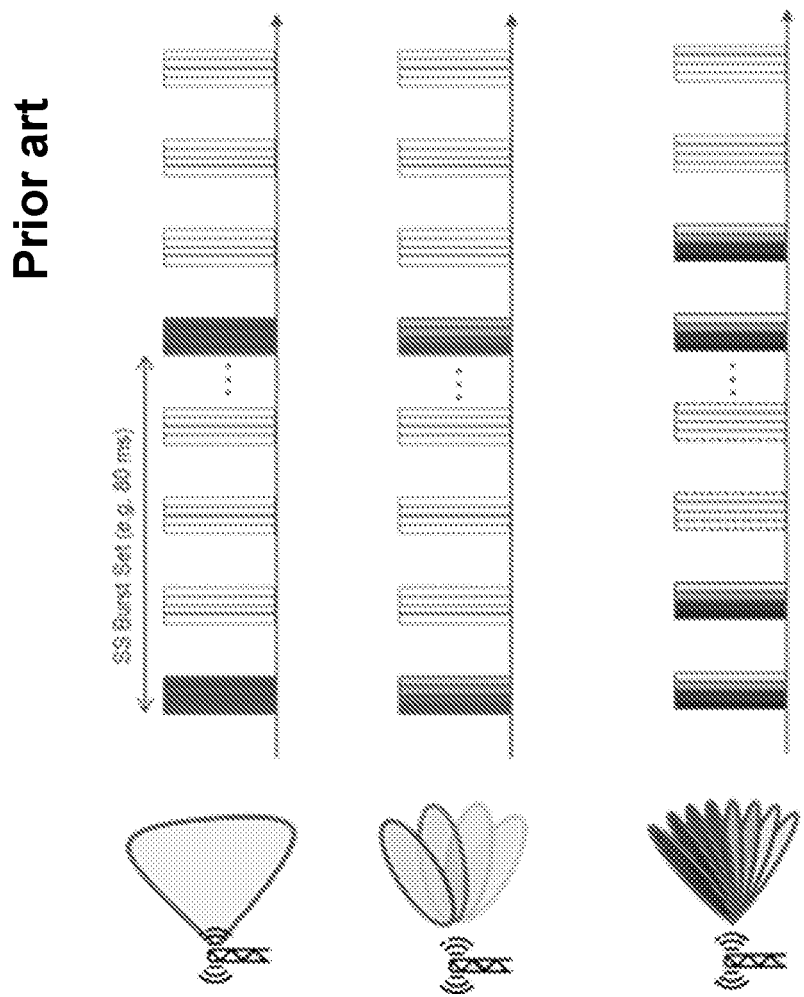
FIG. 3 illustrates three example configurations of an SS Burst set according to embodiments of the present disclosure.
Figure 4:
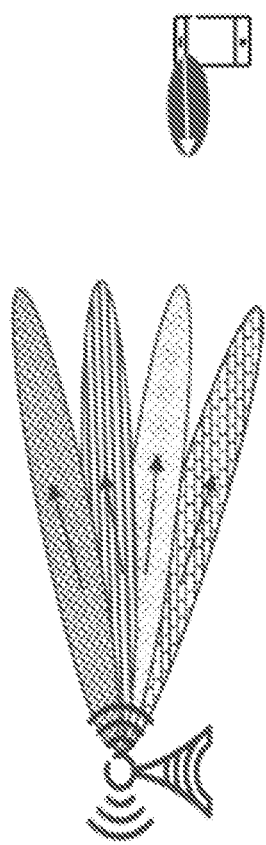
FIG. 4 illustrates a mapping from a beam to a RACH configuration according to embodiments of the present disclosure.
Figure 4:
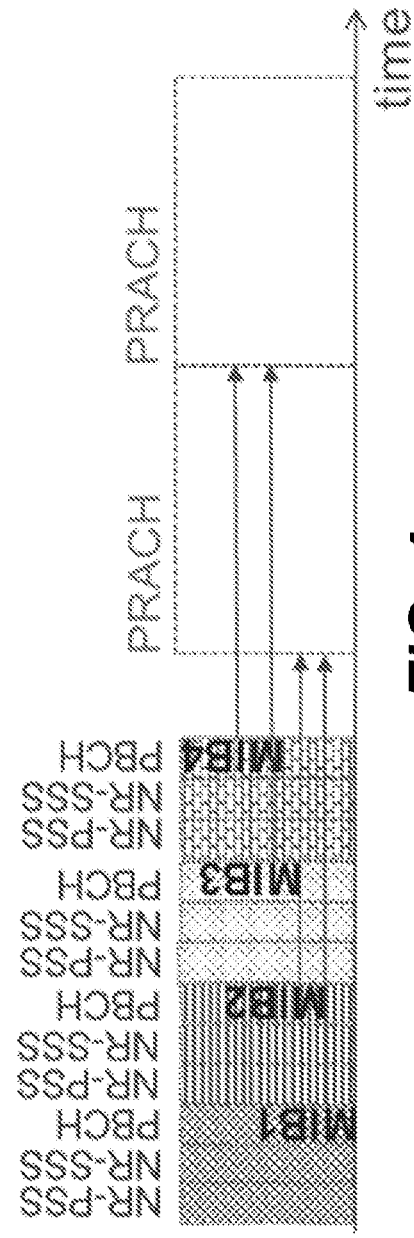

The MAC CE may be as defined in LTE, where each bit in the CE activates a single resource. Or, as shown in FIG. 2B, one bit inside the octet may point to a set of CSI-RSs. In some examples, there is a fixed definition that one bit points to all CSI-RSs configured with quasi-colocation mapping to a specific SSB. In other examples, the mapping includes a separate set of lists of CSI-RS configurations where each bit in the MAC CE points to one set which comprises a list of given CSI-RS configurations. Here, the MAC CE can also be used in normal operation and not only in HO. Accordingly, for the MAC CE one bit may point to a predefined/configuration (for example, a new list of CSI-RS resources). In some examples, there is a list per SSB beam or list per TRP.

Embodiments of the present disclosure include the possibility that the network has initially assigned a configuration type of re-configurations that can be pre-loaded and later activated by the MAC CE based mechanisms. For example, the network node 1100 may know that upon beam recovery, regardless which best beam the wireless device 1110 selects after detecting the failure, only the CSI-RS resources being monitored would change. Accordingly, the network node 1100 can indicate the change in the monitored CSI-RS resources via the RRC messages previously described (i.e. as a recovery configuration). In that case, the number of indexes to be used and indicated in the MAC CE after recovery can be reduced. For example, there can be a configuration type associated to CSI-RS configurations for beam management where the wireless device 1110 should monitor beams and report them. Each configuration can be a subset of CSI-RS resources (e.g., time/frequency/sequence) associated with DL beams of a given cell, where upon beam recovery based on the selection of a new beam (e.g. based on a wide beam SS Block), the wireless device 1110 would be re-configured with a new set of CSI-RS resources transmitted now in a correlated manner with the new SS Block.

At step 1108, wireless device 1110 receives the one or more transmission parameters and implements the one or more transmission parameters to complete the re-configuration. In some examples, the wireless device 1110 receives a list of candidate re-configurations that are indexed (e.g., by an integer value) and one or a subset of these can be further activated by the re-configuration upon beam recovery. In some examples, the wireless device 1110 receives the index to a previously received configuration, which can then be activated by the wireless device 1110 due to the change of a beam after beam recovery. The wireless device 1110 can receive the list of candidate configurations via an RRC Connection Resume and/or an RRC Connection Re-configuration (with mobilityControlInfo in the case a target cell is providing the UE that list to be later used after HO execution) and/or RRC Connection Re-configuration (without mobilityControlInfo in the case or intra-cell procedure) and/or an RRC Connection Setup (e.g., when the UE is trying to connect to a cell). Each configuration in the list can be indexed, and, upon sending a beam failure detection request the wireless device 1110 expects a response message that may contain an indication of the new index to be activated, such that the wireless device 1110 can deactivate a previously active configuration.

In some examples, when the wireless device 1110 has been previously configured with a set of candidate configurations and an index per configuration, a configuration can be activated by an indication transmitted in a MAC based message, such as a random access response and/or a MAC CE. That can be the first MAC message the wireless device 1110 expects after transmitting the beam recovery request or a subsequent message after the wireless device 1110 receives a MAC based message confirming the reception of the request.

Modifications, additions, or omissions may be made to the systems and methods described herein without departing from the scope of the disclosure. The methods may include more, fewer, or other steps. Additionally, steps may be performed in any suitable order. Any of the embodiments described in this document may be combined in any way with each other. Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A method at a network node for connection re-configuration upon beam recovery, the method comprising:
   determining that a successful beam recovery has occurred corresponding to a wireless device;
   determining one or more transmission parameters associated with the successful beam recovery, the one or more transmission parameters for re-configuring the wireless device;
   wherein the one or more transmission parameters include at least one of:
      a time and/or frequency resource that the wireless device transmits a subsequent beam recovery request;
      a sequence that the wireless device transmits the subsequent beam recovery request; or
      a request method that the wireless device uses to transmit the subsequent beam recovery request, wherein the transmission parameters re-configure the request method from (1) a Physical Uplink Control Channel, PUCCH, request method to a Physical Random Access Channel, PRACH, request method or (2) from the PRACH request method to the PUCCH request method; and transmitting the one or more transmission parameters to the wireless device.

2. The method of claim 1, wherein a Radio Resource Control, RRC, connection re-configuration message is used to transmit the one or more transmission parameters.

3. The method of claim 1, wherein a Medium Access Control, MAC, Coverage Enhancement, CE, message is used to transmit the one or more transmission parameters, wherein each bit in the MAC CE indicates a configuration of one or more Channel State Information Reference Signal, CSI-RS, resources.

4. The method of claim 1, wherein the one or more transmission parameters include at least one of:
a type of RS to be monitored;
one or multiple thresholds for a number of events that trigger a beam failure detection;
one or more periodicities;
one or more monitored beam or beam link pair(s); or
one or more Rx beam(s) to be used for monitoring.

5. The method of claim 1, wherein the one or more transmission parameters include at least one of a reception window parameter, a maximum number of failure recovery attempts parameter, a power ramping parameter, or a beam switching parameter.

6. The method of claim 1, wherein the one or more transmission parameters specify (i) a maximum number of beams to compute cell quality and (ii) an absolute threshold for selecting beams for computing an average that indicates cell quality.

7. The method of claim 1, wherein each of the one or more transmission parameters indicate a change to a previously configured parameter, and wherein one or more other previously configured parameters remain unchanged.

8. The method of claim 1, further comprising:
transmitting, to the wireless device, an index of candidate re-configurations, wherein the transmitted one or more transmission parameters activate one or more of the indexed candidate re-configurations.

9. A method at a wireless device for connection re-configuration upon beam recovery, the method comprising:
receiving one or more transmission parameters from a network node, wherein the one or more transmission parameters are associated with a successful beam recovery;
wherein the one or more transmission parameters include at least one of:
a time and/or frequency resource that the wireless device transmits a subsequent beam recovery request;
a sequence that the wireless device transmits the subsequent beam recovery request; or
a request method that the wireless device uses to transmit the subsequent beam recovery request, wherein the transmission parameters re-configure the request method from (1) a Physical Uplink Control Channel, PUCCH, request method to a Physical Random Access Channel, PRACH, request method or (2) from the PRACH request method to the PUCCH request method; and
implementing the one or more transmission parameters received from the network node.

10. The method of claim 9, wherein the transmission parameters are received as part of a Radio Resource Control, RRC, connection re-configuration message from the network node.

11. The method of claim 9, wherein the one or more transmission parameters are received as part of a Medium Access Control, MAC, Coverage Enhancement, CE, message from the network node, wherein each bit in the MAC CE indicates a configuration of one or more Channel State Information Reference Signal, CSI-RS, resources.

12. The method of claim 9, further comprising:
receiving a plurality of candidate re-configurations; and
determining one or more of the plurality of candidate re-configurations for activation upon beam recovery.

13. The method of claim 12, wherein the plurality of candidate re-configurations is received via at least one of:
an RRC Connection resume message;
an RRC connection re-configuration message with mobilityControlInfo;
an RRC connection re-configuration message without mobilityControlInfo; or
an RRC connection setup message.

14. The method of claim 12, wherein the plurality of candidate re-configurations are indexed.

15. The method of claim 12, further comprising:
receiving an indication from the network node, the indication activating one of the plurality of candidate re-configurations.

16. The method of claim 15, wherein the indication is received as part of a MAC based message, wherein the MAC based message includes at least one of:
a random access response message; or
a MAC CE.

17. A network node comprising:
processing circuitry configured to:
determine that a successful beam recovery has occurred;
determine one or more transmission parameters associated with the successful beam recovery, the one or more transmission parameters for re-configuring a wireless device;
wherein the one or more transmission parameters include at least one of:
a time and/or frequency resource that the wireless device transmits a subsequent beam recovery request;
a sequence that the wireless device transmits the subsequent beam recovery request; or
a request method that the wireless device uses to transmit the subsequent beam recovery request, wherein the transmission parameters re-configure the request method from (1) a Physical Uplink Control Channel, PUCCH, request method to a Physical Random Access Channel, PRACH, request method or (2) from the PRACH request method to the PUCCH request method; and
an interface operably coupled to the processing circuitry, the interface configured to:
transmit the one or more transmission parameters to the wireless device.

18. A wireless device comprising:
an interface configured to receive one or more transmission parameters from a network node, wherein the one or more transmission parameters are associated with a successful beam recovery;
wherein the one or more transmission parameters include at least one of:
a time and/or frequency resource that the wireless device transmits a subsequent beam recovery request;
a sequence that the wireless device transmits the subsequent beam recovery request; or a request method that the wireless device uses to transmit the subsequent beam recovery request, wherein the transmission parameters re-configure the request method from (1) a Physical Uplink Control Channel, PUCCH, request method to a Physical Random Access Channel, PRACH, request method or (2) from the PRACH request method to the PUCCH request method and processing circuitry operably coupled to the interface, the processing circuitry configured to implement the one or more transmission parameters received from the network node.

\* \* \* \* \*